United States Patent [19]

Naines et al.

[11] Patent Number: 5,409,330
[45] Date of Patent: Apr. 25, 1995

[54] CABLE CONNECTOR

[75] Inventors: Anthony F. Naines; Raymond Grothause, both of Naples, Fla.

[73] Assignee: Loos and Co., Inc., Pomfret, Conn.

[21] Appl. No.: 117,421

[22] Filed: Sep. 7, 1993

[51] Int. Cl.⁶ ............................................. F16B 7/00
[52] U.S. Cl. ............................... 403/292; 403;300/24
[58] Field of Search .............. 24/116 A, 114.5, 683, 24/684, 702, 700, 701; 403/300, 308, 314, 292

[56] References Cited

U.S. PATENT DOCUMENTS

| | | | |
|---|---|---|---|
| 2,765,471 | 10/1956 | Cousins | 24/702 |
| 3,464,093 | 9/1969 | Laharty | 24/114.5 |
| 4,216,567 | 8/1980 | Heinz | 24/116 A |
| 5,246,303 | 9/1993 | Trilla et al. | 24/702 |

OTHER PUBLICATIONS

DD Form 672-1—MS20663, 1987.
T.O.1-1A-8—Navair 0101A-8, Nov. 1983.
MIL STD-1599, Requirement 601—31 Jan. 1980 NAS 1435, 1965.
Loos & Company, Inc. 1992, Specifications for Strap Forks and Strap Eyes.

*Primary Examiner*—Richard A. Bertsch
*Assistant Examiner*—William Wicker
*Attorney, Agent, or Firm*—Hayes & Reinsmith

[57] ABSTRACT

A double-shank ball fitting has a ball with integrally formed shanks projecting in opposite radial directions from a center of the ball for releasable locking engagement with a mating fitting having a pair of longitudinally aligned, reversed keyhole openings sharing a common ball swivel cavity with individual grooves disposed along opposed major surfaces of that mating fitting to form longitudinally aligned, shank-receiving slots.

12 Claims, 4 Drawing Sheets

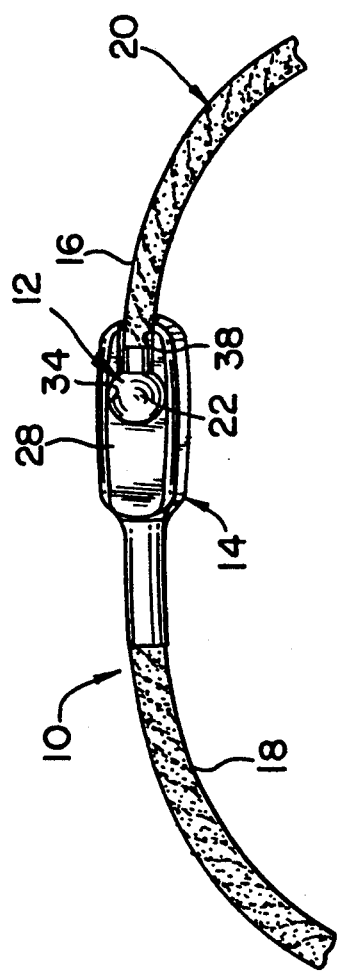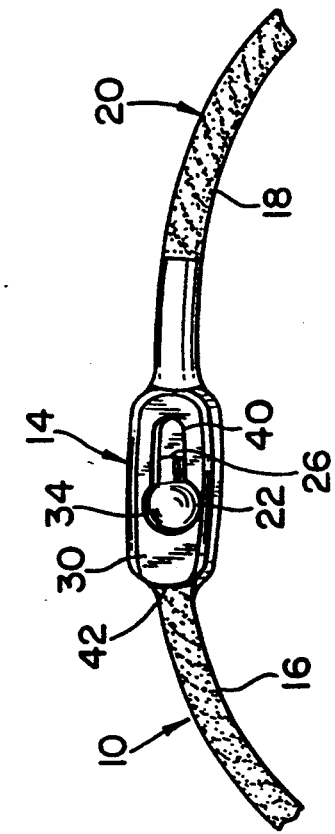

5,409,330

CABLE CONNECTOR

FIELD OF THE INVENTION

This invention generally relates to improvements in connectors for rope, line, wire rope or cable and the like and particularly concerns a unique connector which is readily engaged in a locked position and released with equal facility without tying, wiring or otherwise requiring complex manual movements or time consuming techniques in securing ends of the elements to which they are attached.

BACKGROUND OF THE INVENTION

While a wide variety of different types of couplings in connector devices have been available for use in various applications of rope, line, wire rope and cable connections, many of the known devices involve relatively complicated or complex components as connecting elements or require movements less than simplistic for securing and releasing the connecting device.

OBJECTS OF THE INVENTION

A primary object of this invention is to provide a new and improved connector assembly for end portions of rope, line, wire rope or cable and the like which not only is quick and easy to manufacture but is particularly facile to use when it is desired to secure and readily release end portions of such cable while permitting repeated reuse of the assembly.

Another object of this invention is to provide an assembly of the above described type which not only provides a simple way of joining two ends of cable together, while possessing the ability to separate the two, but also is particularly suited to resist heavy loading in view of a unique ball and socket connection which effects reliable performance over an extended period of time under demanding conditions.

Other objects will be in part obvious and in part pointed out more in detail hereinafter.

SUMMARY OF THE INVENTION

A cable connector assembly of this invention comprises a first member having a ball with a pair of integral shanks projecting from the ball in opposite radial directions. That first member is attachable to one cable end portion. A mating member having an elongated body is attachable at one end of the body to another cable end portion. The mating member has a round cavity extending transversely through its body and a pair of grooves extending from the cavity in opposite radial directions longitudinally of the body along opposed surfaces of that mating member.

A better understanding of this invention will be obtained from the following detailed description and accompanying drawings of an illustrative application of the invention.

BRIEF DESCRIPTION OF THE DRAWINGS

FIG. 4 is a plan view, partly broken away, showing the connector assembly of FIG. 1 in locked position; and FIG. 5 is a plan view similar to FIG. 4 showing the assembly in reversed relation to FIG. 4.

DESCRIPTION OF A PREFERRED EMBODIMENT

Figure 1:
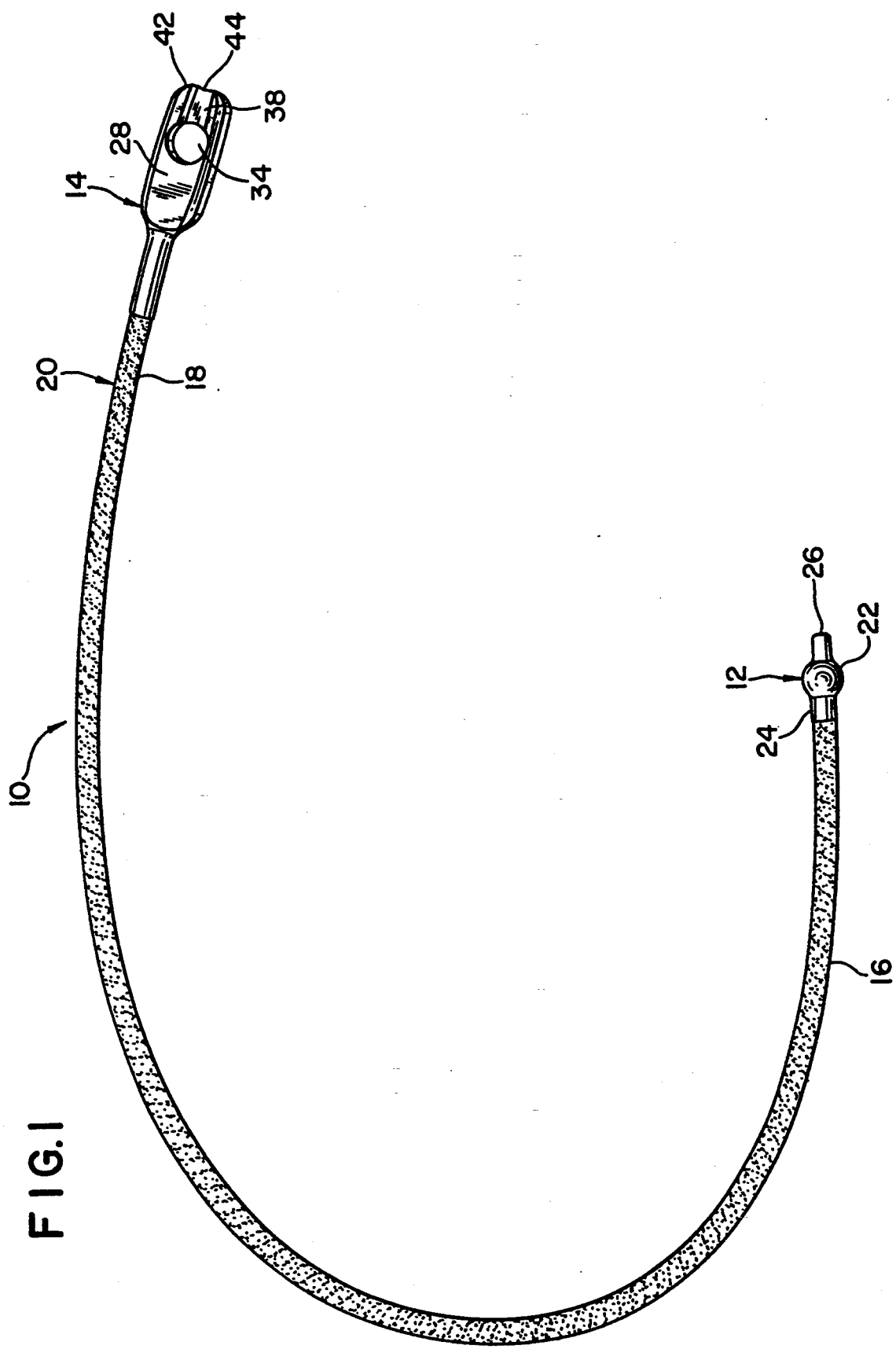
FIG. 1 is a plan view of a connector assembly of this invention showing fittings of that assembly in a released position.

Referring now to the drawings in detail, a connector assembly 10 is illustrated having a pair of fittings 12 and 14 attached to end portions 16 and 18 of a length of conventional cable 20. Assembly 10 is equally applicable to being used with rope, line, or wire rope and the like (collectively referred to hereinafter as cable). Fitting, or first member, 12 is a tubular unit attachable to one cable end portion 16 and is illustrated having an intermediate enlargement or spherical ball 22 of enlarged diameter relative to a pair of first and second shanks 24 and 26 integrally formed on that ball 22 to project in opposite radial directions along a common major axis through a center of the ball 22. The outside ball diameter of the fitting 12 is of enlarged size relative to its shank diameters. The fitting 12 may be swaged in its entirety onto cable end portion 16. The second shank 26 which serves as a terminal element of that first fitting 12, is shown having a closed end.

By virtue of the above described construction of double-shank ball fitting 12, the mating member or fitting 14, which is attached to cable end portion 18, is illustrated having an elongated body with opposed flat major surfaces 28 and 30 which are generally coplanar with a major longitudinally extending axis 32 (FIG. 3) of the fitting 14. That mating fitting 14 has a pair of longitudinally aligned, reversed keyhole openings therein sharing a common ball swivel 34. Cavity 34 extends completely through the fitting 14 to form openings disposed in opposed major surfaces 28 and 30, the openings being aligned with one another relative to a transverse axis 36 (FIG. 3) in perpendicular relation to the major longitudinal axis 32 of the mating member 14.

Figure 2:
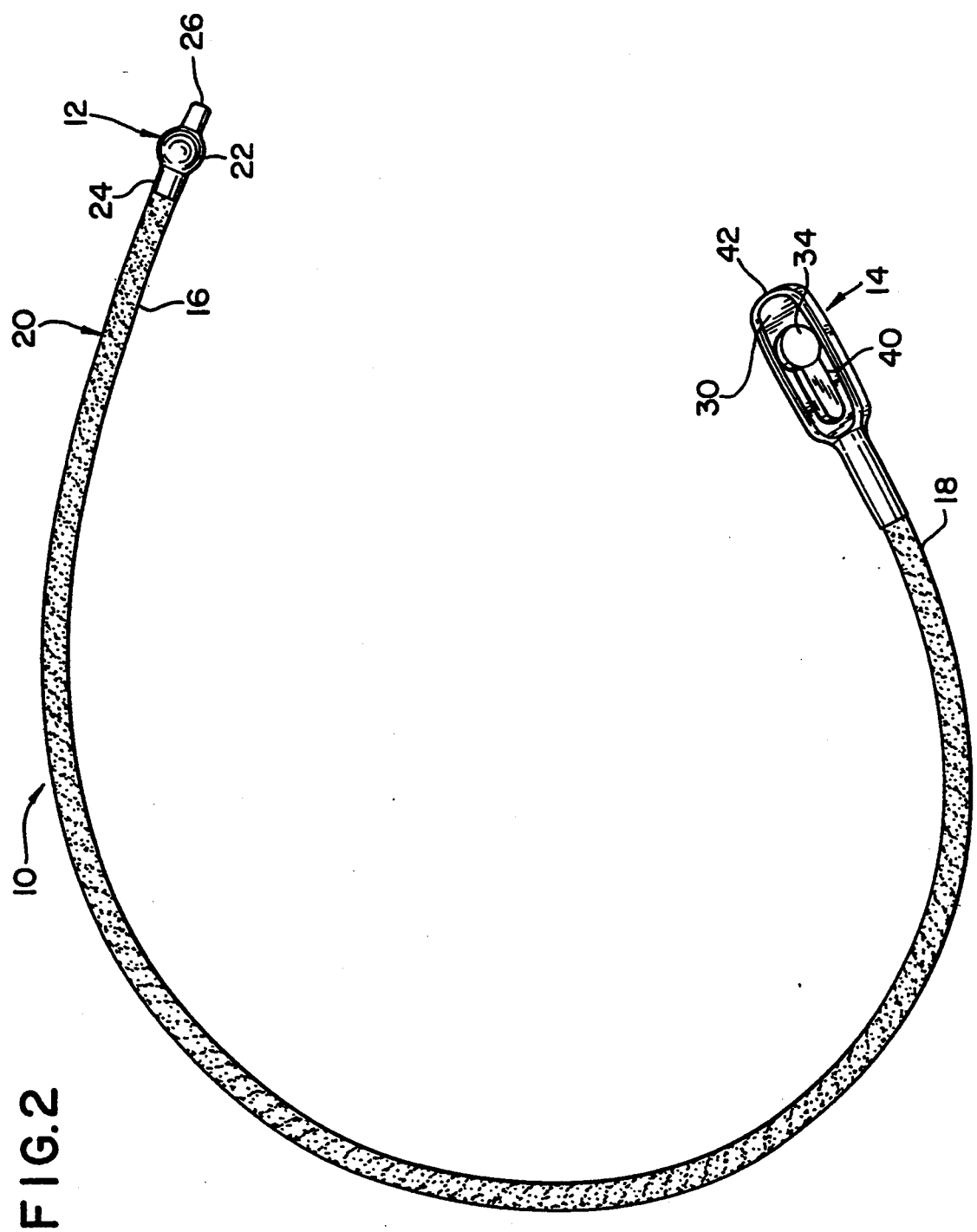
FIG. 2 is a plan view similar to FIG. 1 showing the connector assembly in reversed relation to FIG. 1 and illustrating opposite surfaces of the fittings.

Individual grooves 38 and 40 lead from that common ball swivel cavity 34 to respectively extend in opposite linear directions. Groove 38 (best seen in FIG. 1) is located on major surface 28 of the fitting 14, and groove 40 (best seen in FIG. 2) extends in an opposite linear direction along the opposed major surface 30 of the fitting 14. Groove 38 terminates at a free end 42 of fitting 14 and thus forms an unobstructed terminal opening in that fitting 14. The grooves 38, 40 each have opposed elongated shoulders spaced apart a distance less than the diameter of its cavity 34 to form longitudinally aligned, shank-receiving slots dimensioned and configured to receive the shanks 24, 26 of fitting 12.

The above described construction of the fittings 12 and 14 accordingly feature a particularly simple and compact connector construction for quick and easy locking of cable end portions 16 and 18 to one another while at the same time serving to effect efficient release of the fittings when disengagement of the cable end portions is desired.

Figure 3:
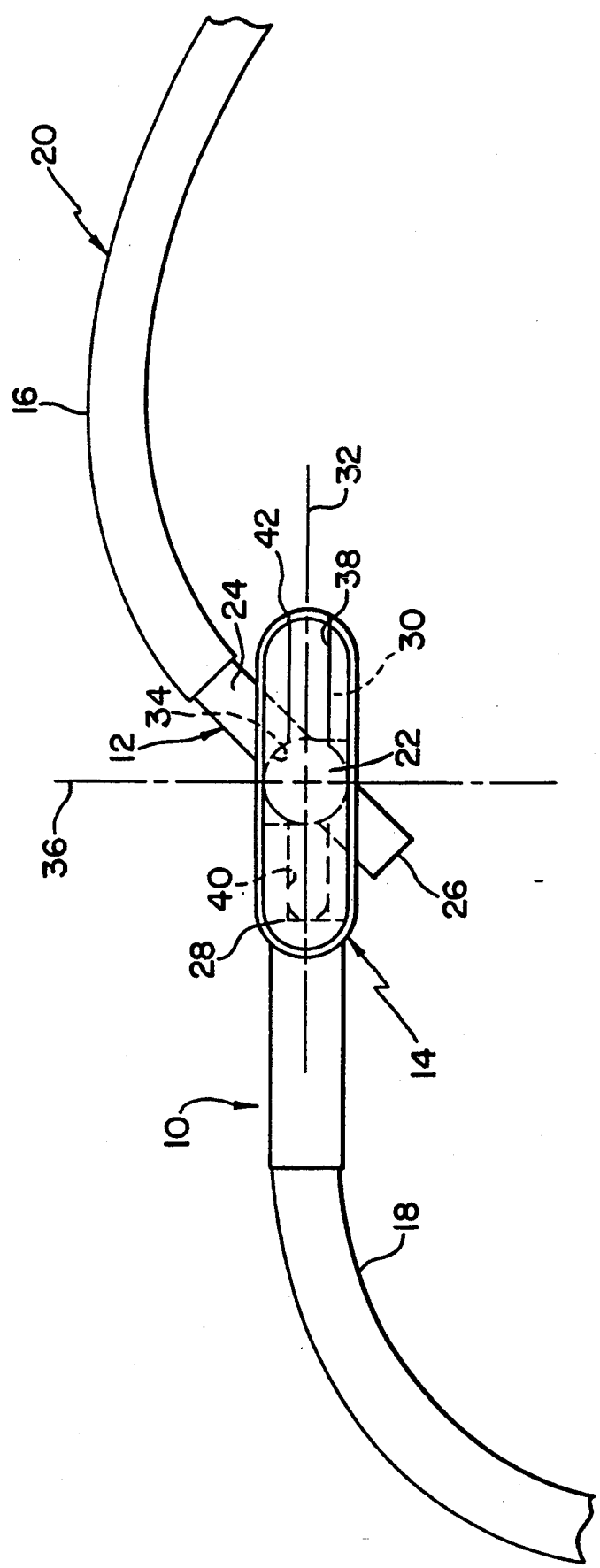
FIG. 3 is an enlarged side elevational view, partly broken away, of the connector assembly of this invention shown in a partially engaged condition.

More specifically, the first fitting 12 and the cavity 34 of its mating fitting 14 are configured and dimensioned to permit the terminal shank 26 of fitting 12 to be inserted through cavity 34 and to fit the ball 22 into contact engagement within the body of fitting 14 surroundings that cavity 34 when the fitting 12 is in a predetermined non-aligned angular orientation at about 45° relative to its mating fitting 14 (FIG. 3). Then, upon rotating that fitting 12 in one angular direction from its partially engaged Condition (clockwise as viewed in FIG. 3), the cable end portions 16, 18 are then brought into general alignment with the fittings in locked position. The ball 22 of the fitting 12 thus serves as a pivot within cavity 34 of mating fitting 14 to readily seat the shanks 24 and 26 within the grooves 38 and 40 and thereby to secure the assembly 10 in a releasable locked position (FIGS. 4 and 5).

Thereafter, the fittings 12, 14 and cable end portions 16, 18 are further positively secured in their locked position by any cable tension. Accordingly, the connector assembly components may be formed of a predetermined size and of stainless steel or of any other suitable material configured and dimensioned with a preselected hardness sufficient to provide a predetermined tensile strength. That tensile strength has been tested to be at least equal to the breaking strength of the end portions of wire rope or cable.

When the assembly 10 is in its locked position and the cable end portions 16, 18 are relaxed, the fitting 12 is rotatable in an opposite angular direction through a given angular displacement sufficient to permit its ball 22 and terminal shank 26 to be returned to the partially engaged condition shown in FIG. 3 and then withdrawn through the cavity 34 of mating fitting 12 to thereby unlock and release the assembly.

It will be appreciated by those skilled in the art that while the embodiment shown in the drawings is a single length of cable, the connector of this invention is readily adapted to be used with other lines, rope and the like wherein their end portions are desired to be quickly and easily connected and then releasably disengaged and thereafter reused. The fittings may be respectively mounted on end portions either of a single cable or of different cables and are not only readily attached to such elements but are particularly suited to provide a connector which is both sturdy and durable to ensure reliable securing of the rope, lines, wire rope or cable without any further requisites of wiring or otherwise supplementing the integrity of the connection. Added load on the connector components imposed by any cable tension only serves to strengthen the hold by virtue of the unique construction of the fittings of this invention.

Although this invention has been illustrated and described with respect to an exemplary embodiment thereof, additions may be made without departing from the spirit and scope of the invention.

We claim:
1. A cable connector assembly comprising
   a first member including an enlargement with first and second integral shanks projecting from the enlargement in opposite directions, the enlargement being formed as a ball of enlarged size relative to its integral shanks, the first member being attachable to one cable end portion, and
   a mating member having an elongated body attachable to another cable end portion, the mating member having a cavity extending transversely through its body and a pair of grooves extending from the cavity in opposite directions longitudinally of the body but along opposed surfaces of that mating member.

2. The connector assembly of claim 1 wherein the mating member grooves form shank-receiving seats and the mating member cavity forms a ball-receiving socket.

3. The connector assembly of claim 1 wherein the shanks of the first member are generally cylindrical,
   wherein the ball diameter of the first member is of enlarged size relative to its shank diameters, and
   wherein the grooves of the mating member each have opposed shoulders spaced apart a distance less than the diameter of its cavity for receiving the shanks in a locked position.

4. The connector assembly of claim 1 wherein the first member and its mating member are attachable to one another to be positively secured in locked position by cable tension, the connector assembly components being of a preselected material and size configured and dimensioned to provide a tensile strength at least equal to the breaking strength of the cable end portions.

5. The connector assembly of claim 1 wherein the first member is a generally tubular unit, and wherein the first member and its mating member are formed of stainless steel and are swaged to said cable end portions.

6. The connector assembly of claim 1 wherein a second shank serves as the terminal element of the first member.

7. A cable connector assembly comprising
   a first member including an enlargement with first and second integral shanks projecting from the enlargement in opposite directions, the first shanks being attachable to one cable end portion, and
   a mating member having an elongated body attachable to another cable end portion, the mating member having a cavity extending transversely through its body and a pair of grooves extending from the cavity in opposite directions longitudinally of the body but along opposed surfaces of that mating member, one of the grooves of the mating member extending from its cavity along one surface of the mating member to a free end thereof and forming an unobstructed terminal opening in the mating member, and
   said one cable end portion attachable to the first shank being received within the terminal opening in the mating member when the assembly is disposed in locked position.

8. The connector assembly of claim 7 wherein the first member and the cavity of its mating member are configured and dimensioned to permit the second shank of the first member to be inserted through said cavity and to fit the enlargement in that cavity when the first member is in a predetermined non-aligned angular orientation relative to its mating member whereby, upon rotating the first member in one angular direction to bring the cable end portions into alignment, the enlargement of the first member serves as a pivot within the cavity of the mating member to seat the shanks within the grooves and thereby to secure the assembly in a releasable locked position.

9. The connector assembly of claim 8 wherein, when the assembly is in its locked position and the cable end portions are relaxed, the first member is rotatable in an opposite angular direction through a given angular displacement to permit its enlargement and second shank to be withdrawn through the mating member cavity to unlock the assembly.

10. The connector assembly of claim 9 wherein said given angular displacement is about 45°.

11. A cable connector comprising first and second members for quickly and easily connecting cable end portions in a releasable assembly, the first member including a double shank ball fitting having a ball disposed between integrally formed shanks of reduced size relative to the ball with the shanks projecting in opposite radial directions from a center of that ball, and the second member having an elongated body with opposed major surfaces and a major longitudinal axis, the body of the second member further having a pair of longitudinally aligned, reversed key hole openings therein sharing a common ball swivel cavity extending through the second member to form openings disposed in said opposed major surfaces in alignment with a transverse axis of the body in perpendicular relation to its major longitudinal axis, the body having individual grooves leading from its cavity and respectively extending in opposite linear directions longitudinally along the body, the grooves being disposed along said opposed major surfaces of the second member to form longitudinally aligned shank-receiving slots located on opposite surfaces of the second member along its major longitudinal axis.

12. A cable connector assembly comprising a first member including an enlargement with a pair of integral shanks projecting from the enlargement in opposite directions, the enlargement being formed as a spherical ball of enlarged size relative to its integral shanks, the latter projecting outwardly in opposite radial directions along a common major axis through a center of the ball, the first member being attachable to one cable end portion, and a mating member having an elongated body attachable to another cable end portion, the mating member having a cavity extending transversely through its body and a pair of grooves extending from the cavity in opposite directions longitudinally of the body but along opposed surfaces of that mating member.

* * * * *